United States Patent
Jiang et al.

(10) Patent No.: US 11,840,626 B2
(45) Date of Patent: Dec. 12, 2023

(54) POLY ALPHA-1,3-GLUCAN COMPOUNDS

(71) Applicant: NUTRITION & BIOSCIENCES USA 4, INC., Rochester, NY (US)

(72) Inventors: Xian Jiang, Newark, DE (US); Vindhya Mishra, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 637 days.

(21) Appl. No.: 16/645,671

(22) PCT Filed: Aug. 30, 2018

(86) PCT No.: PCT/US2018/048683
§ 371 (c)(1),
(2) Date: Mar. 9, 2020

(87) PCT Pub. No.: WO2019/050750
PCT Pub. Date: Mar. 14, 2019

(65) Prior Publication Data
US 2020/0277485 A1  Sep. 3, 2020

Related U.S. Application Data

(60) Provisional application No. 62/556,623, filed on Sep. 11, 2017.

(51) Int. Cl.
C08L 51/06 (2006.01)
C08L 5/00 (2006.01)
C08L 77/06 (2006.01)

(52) U.S. Cl.
CPC .......... *C08L 51/06* (2013.01); *C08L 5/00* (2013.01); *C08L 77/06* (2013.01); *C08L 2203/16* (2013.01)

(58) Field of Classification Search
CPC .......... C08L 51/02; C08L 51/06; C08L 51/08; C08L 5/00–06
See application file for complete search history.

(56) References Cited

U.S. PATENT DOCUMENTS

| | | |
|---|---|---|
| 3,264,272 A | 8/1966 | Rees |
| 4,187,358 A | 2/1980 | Ky et al. |
| 7,000,000 B1 | 2/2006 | O'Brien |
| 9,080,195 B2 | 7/2015 | O'Brien et al. |
| 2005/0131119 A1 | 6/2005 | Wood |
| 2015/0259439 A1 | 9/2015 | Nambiar et al. |

FOREIGN PATENT DOCUMENTS

| | | |
|---|---|---|
| WO | 2015095046 A1 | 6/2015 |
| WO | 2016106068 A1 | 6/2016 |
| WO | WO 2018/106574 A1 * | 6/2018 |

OTHER PUBLICATIONS

International Preliminary Report on Patentability for PCT/US18/48683 dated Mar. 17, 2020.
Puanglek et al., Scientific Reports, vol. 6, No. 1, pp. 1-8.

* cited by examiner

*Primary Examiner* — Ana L. Woodward

(57) ABSTRACT

A poly alpha-1,3-glucan compound comprising: a) poly alpha-1,3-glucan, and b) a functionalized polyolefin; wherein said poly alpha-1,3-glucan compound comprises from 0.5 to 70 weight percent of poly alpha-1,3-glucan, based on the total weight of poly alpha-1,3-glucan (a) and functionalized polyolefin (b) in the poly alpha-1,3-glucan compound and wherein said functionalized polyolefin is grafted onto the poly alpha-1,3-glucan. These poly alpha-1,3-glucan compounds have many uses including films for packaging applications and as elastomers for automotive applications.

13 Claims, No Drawings

POLY ALPHA-1,3-GLUCAN COMPOUNDS

This application is the National Stage application of International Application No. PCT/US2018/048683 (filed Aug. 30, 2018), which claims the benefit of U.S. Provisional Application No. 62/556,623 (filed Sep. 11, 2017), both of which prior applications are incorporated herein by reference in their entirety.

OVERVIEW

Described herein are poly alpha-1,3-glucan compounds prepared by the reaction of poly alpha-1,3-glucan with at least one functionalized polyolefin. Also described herein are polymer compositions comprising said poly alpha-1,3-glucan compounds and articles prepared from these polymer compositions.

These novel poly alpha-1,3-glucan compounds may have many uses including films for packaging applications and as elastomers for automotive applications. These poly alpha-1,3-glucan compounds may also allow for an indirect compatibilization of poly alpha-1,3-glucan with polymer compositions in which poly alpha-1,3-glucan is not readily compatible.

Polymers chosen for use in polymer compositions are typically based on the desired physical properties of the articles prepared from the polymer compositions. However, there is always a general desire to improve or modify the physical properties of polymer compositions to improve the performance of the articles.

It has now been discovered that these novel poly alpha-1,3-glucan compounds may be used in polymer compositions to improve one or more physical properties of the polymer composition.

Abbreviations

The claims and description herein are to be interpreted using the abbreviations and definitions set forth below.
"%" refers to the term percent.
"wt %" refers to weight percent.
"MPa" refers to megapascal
"KJ/m$^2$" refers to Kilojoule/square meter

Definitions

As used herein, the article "a" refers to one as well as more than one and does not necessarily limit its referent noun to the grammatical category of singular number.

As used herein, the term "article" refers to an item, thing, structure, object, element, device, etc. that is in a form, shape, configuration that is suitable for a particular use or purpose without further processing of the entire entity or a portion of it.

As used herein, the term "functionalized polyolefin" refers to polyolefins that comprise at least one functional group selected from anhydride groups, acid groups, a metal salt of a carboxylic acid, epoxy groups, or a combination of these. The functional groups may be grafted onto the polymer backbone or may be present in the polymer backbone.

As used herein, the term "polymer resin" refers to the polymer used in the polymer compositions. For example, in a polyamide composition, a polyamide resin, such as polyamide 66 is used as the polymer resin.

As used herein, the term "polymer composition" refers to a polymer resin and, optionally, any additional materials used in the composition such as UV stabilizers, lubricants, and fillers. If no additional materials are present in the polymer composition, then the polymer composition and polymer resin are identical.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

The terms "poly alpha-1,3-glucan", "alpha-1,3-glucan polymer" and "glucan polymer" are used interchangeably herein.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Disclosed herein are poly alpha-1,3-glucan compounds which may be used to prepare articles such as films and elastomers. The poly alpha-1,3-glucan compounds disclosed herein may be prepared by reaction of poly alpha-1,3-glucan with functionalized polyolefins in which the functionalized polyolefin is grafted onto the poly alpha-1,3-glucan. It is preferred that the poly alpha-1,3-glucan compounds be prepared by reactive extrusion processes.

The poly alpha-1,3-glucan compounds may also be used in polymer compositions, especially polyamide and polyester compositions, to modify certain physical properties depending on the end use application.

Specifically, disclosed herein are poly alpha-1,3-glucan compounds comprising:
  a) poly alpha-1,3-glucan, and
  b) a functionalized polyolefin;
wherein said poly alpha-1,3-glucan compound comprises from 1 to 70 weight percent of functionalized polyolefin grafted onto the poly alpha-1,3-glucan, based on the total weight of poly alpha-1,3-glucan (a) and functionalized polyolefin (b) in the poly alpha-1,3-glucan compound.

Also disclosed herein are polymer compositions comprising the poly alpha-1,3-glucan compounds and processes for preparing the poly alpha-1,3-glucan compounds.
Poly Alpha-1,3-Glucan Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The 1,3-linkage of the poly alpha-1,3-glucan can be illustrated as follows:

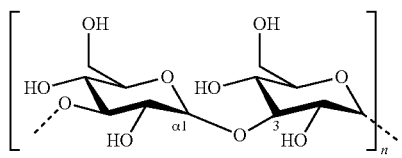

where n is an integer of at least 3.

The poly alpha-1,3-glucan used to prepare the poly alpha-1,3-glucan compounds described herein is a solid having a particle size of from about 50 to 0.1 microns, preferably from 25 to 0.5 microns, and more preferably from 10 to 0.5 microns.

The weight percent of poly alpha-1,3-glucan which may be present in the poly alpha-1,3-glucan compounds may range from about 0.5 to 70 weight percent, preferably from 5 to 60 weight percent, more preferably from about 10 to 50 weight percent, and most preferably from about 15 to 40 weight percent, based on the total weight of poly alpha-1,3-glucan and functionalized polyolefin in the poly alpha-1,3-glucan compound.

Functionalized Polyolefin

Functionalized polyolefins used to prepare poly alpha-1,3-glucan compounds described herein comprise a functional group selected from an anhydride group, an acid group, a metal salt of a carboxylic acid, an epoxy group, or a combination of these.

Examples of functionalized polyolefins include ethylene copolymers in which the functional groups are copolymerized into the polymer, for instance, a copolymer of ethylene and a (meth)acrylate monomer containing the appropriate functional group. Herein the term (meth)acrylate means the compound may be either an acrylate, a methacrylate, or a mixture of the two. Useful (meth)acrylate functional compounds include (meth)acrylic acid and glycidyl(meth)acrylate. In addition to ethylene and a functionalized (meth)acrylate monomer, other monomers may be copolymerized into such a polymer, such as vinyl acetate, unfunctionalized (meth)acrylate esters such as ethyl (meth)acrylate, n-butyl (meth)acrylate, butyl (meth)acrylate and cyclohexyl (meth)acrylate.

Suitable functionalized polyolefins may also include ionomers. By an ionomer is meant a carboxyl group containing polymer that has been neutralized or partially neutralized with metal cations such as zinc, magnesium, and manganese. Examples of ionomers are described in U.S. Pat. Nos. 3,264,272 and 4,187,358, both incorporated by reference herein. Examples of suitable carboxyl group containing polymers include, but are not limited to, ethylene/acrylic acid copolymers and ethylene/methacrylic acid copolymers. The carboxyl group containing polymers may also be derived from one or more additional monomers, such as, but not limited to, butyl acrylate. Ionomers are commercially available under the Surlyn® trademark from E.I. du Pont de Nemours and Co., Wilmington, DE The functionalized polyolefin may preferably be based on an ethylene/α-olefin copolymer. Diene monomers such as 1,4-hexadiene or dicyclopentadiene may optionally be used in the preparation of the copolymer such as ethylene-propylene-diene (EPDM) polymers. The carboxyl moiety may be introduced during the preparation of the polyolefin by copolymerizing with an unsaturated carboxyl-containing monomer. A preferred functionalized polyolefin is an ethylene/α-olefin copolymer grafted with 0.3 to 5 wt % maleic anhydride. The α-olefin is preferably selected from butane, hexane, and octane. Blends of copolymers comprising functional groups may also be used as functionalized polyolefins. Examples of ethylene/α-olefin copolymers which have been grafted with maleic anhydride include those commercial copolymers under the PARALOID™ brand from Dow Chemical, Midland Michigan Herein the term ethylene copolymers include ethylene terpolymers and ethylene multi-polymers, i.e. having greater than three different repeat units. Ethylene copolymers useful as functionalized polyolefins described herein include those selected from the group consisting of ethylene copolymers of the formula E/X/Y wherein:

E is the radical formed from ethylene;

X is selected from the group consisting of radicals formed from

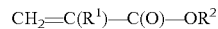

wherein $R^1$ is H, $CH_3$ or $C_2H_5$, and $R^2$ is an alkyl group having 1-8 carbon atoms; vinyl acetate; and mixtures thereof; wherein X comprises 0 to 50 weight % of E/X/Y copolymer;

Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and potassium, sodium and zinc salts of said preceding acids, glycidyl (meth)acrylate, 2-hydroxyethyl (meth)acrylate, 2-isocyanatoethyl (meth)acrylate and glycidyl vinyl ether; wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer.

It is preferred that the functionalized polyolefin comprise a minimum of about 0.5, more preferably 1.0, and most preferably about 2 weight percent of repeat units and/or grafted molecules containing functional groups, and a maximum of about 15, more preferably about 13, and most preferably about 10 weight percent of monomers containing functional groups. It is to be understood than any preferred minimum amount may be combined with any preferred maximum amount to form a preferred range. There may be more than one type of functional monomer present in the functionalized polyolefin, and/or more than one functionalized polyolefin.

The concentration of functionalized polyolefin(s) present in the poly alpha-1,3-glucan compounds described herein may range from about 99.5 to 30 weight percent, preferably from 95 to 40 weight percent, more preferably from about 90 to 50 weight percent, and most preferably from 85 to 60 weight percent based on the total weight percent of functionalized polyolefin(s) and poly alpha-1,3-glucan used in the preparation of poly alpha-1,3-glucan compounds. The concentration of functionalized polyolefins in the poly alpha-1,3-glucan compounds may be varied based on the concentration of functional groups within the functionalized polyolefin or the physical properties desired based on the end use application.

Poly Alpha-1,3-Glucan Compounds

The poly alpha-1,3-glucan compounds disclosed herein are prepared by reacting or grafting functionalized polyolefins onto a poly alpha-1,3-glucan molecule. The functionalized polyolefin comprises at least one type of functional group such as anhydride groups, acid groups, metal salts of carboxylic acid groups, and epoxy groups. The reaction creates a covalent bond between the functional groups of the functionalized polyolefin and hydroxyl groups of the poly alpha-1,3-glucan.

The poly alpha-1,3-glucan compounds can be used to more efficiently compatibilize poly alpha-1,3-glucan into polymers in which neat poly alpha-1,3-glucan may not be compatible, resulting in an improvement or modification in physical properties of the polymers. Additionally, the poly alpha-1,3-glucan compounds may be used in applications such as packaging (films) and as elastomers in automotive applications.

Polymer Compositions

The poly alpha-1,3-glucan compounds disclosed herein may be mixed with various polymer compositions to improve the physical properties of the polymer composition.

Examples of polymer compositions which may be compounded or mixed with poly alpha-1,3-glucan compounds include polyamide compositions, polyester compositions, and polyolefin compositions.

The polymer compositions are prepared from a polymer resin and any additional materials which may optionally be present. The concentration of poly alpha-1,3-glucan compound in the polymer compositions described herein may range from 0.1 to 60, preferably from 1 to 50, more preferably from 5 to 40, and most preferably from 5 to 35 weight percent, based on the total weight of the polymer resin and poly alpha-1,3-glucan compound.

The concentration of poly alpha-1,3-glucan compound in the polymer compositions may vary based on the weight percent of functionalized polyolefin grafted onto the poly alpha-1,3-glucan. For example, as the concentration of poly alpha-1,3-glucan increases in a poly alpha-1,3-glucan compound, the concentration of poly alpha-1,3-glucan compound in the polymer composition may decrease relative to a poly alpha-1,3-glucan compound which comprises a lower concentration of poly alpha-1,3-glucan in the poly alpha-1, 3-glucan compound.

Additives

The polymer compositions disclosed herein can further comprise one or more additives, wherein the additives are pigments, surfactants, fillers, stabilizers, UV absorbers, dispersants, flame retardants, antimicrobial agents, plasticizers or a combination thereof.

Polyamide Compositions

Polyamide compositions disclosed herein comprise at least one polyamide resin and at least one poly alpha-1,3-glucan compound. The concentration of poly alpha-1,3-glucan compound in the polyamide compositions described herein may range from 0.1 to 60, preferably from 1 to 50 percent, more preferably from 5 to 40, and most preferably from 5 to 35 weight percent, based on the total weight of the polyamide resin and poly alpha-1,3-glucan compound in the polyamide composition.

Polyamide resins which may be used to prepare the polyamide compositions described herein are not limited and may be any polyamide resin having a melting point below about 300° C. and above about 130° C. The polyamide resins are condensation products of one or more dicarboxylic acids and one or more diamines, and/or one or more aminocarboxylic acids, and/or ring opening polymerization products of one or more cyclic lactams. Suitable cyclic lactams are caprolactam and laurolactam. Polyamide resins may be fully aliphatic or semi-aromatic.

Fully aliphatic polyamide resins are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid (C6), pimelic acid (C7), suberic acid (C8), azelaic acid (C9), decanedioic acid (C10), dodecanedioic acid (C12), tridecanedioic acid (C13), tetradecanedioic acid (C14), pentadecanedioic acid (C15), hexadecanedioic acid (C16) and octadecanedioic acid (C18). Diamines can be chosen among diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamide resins may be a homopolymer, a copolymer, a terpolymer and may be formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids, as disclosed above. Alternatively, an aromatic diamine such as meta-xylylene diamine (MXD) can be used to provide a semi-aromatic polyamide, an example of which is MXD6, a homopolymer comprising MXD and adipic acid.

Preferred polyamide resins disclosed herein include poly (hexamethylene terephthalamide/2-methylpentamethylene terephthalamide) (PA6T/DT); poly(hexamethylene hexanediamide) (PA66); poly(hexamethylene dodecanediamide) (PA612); poly(hexamethylene decanediamide) (PA610); poly(ε-caprolactam) (PA6); and blends of these.

Depending on the end use application of the poly alpha-1,3-glucan compounds described herein, one of skill in the art can easily choose the concentration of poly alpha-1,3-glucan in the poly alpha-1,3-glucan composition necessary to obtain the desired physical properties such as elongation at break and modulus of articles comprising the poly alpha-1,3-glucan compounds.

Polyester Compositions

Polyester compositions disclosed herein comprise at least one polyester resin and at least one poly alpha-1,3-glucan compound. The concentration of poly alpha-1,3-glucan compound in the polyester compositions described herein may range from 0.1 to 60, preferably from 1 to 50 percent, more preferably from 5 to 40, and most preferably from 5 to 35 weight percent, based on the total weight of the polyester resin and poly alpha-1,3-glucan compound in the polyolefin composition.

Polyester resins suitable for use herein may comprise thermoplastic polyester homopolymers and copolymers. Thermoplastic polyesters are typically derived from one or more dicarboxylic acids and diols.

Suitable thermoplastic polyester resins include without limitation poly(ethylene terephthalate) (PET), poly(trimethylene terephthalate) (PTT), poly(1,4-butylene terephthalate) (PBT), poly(ethylene 2,6-naphthoate) (PEN), and poly(1,4-cyclohexyldimethylene terephthalate) (PCT) and copolymers and blends of the same. Of these, the preferred thermoplastic polyester resins are selected from poly(ethylene terephthalate) (PET), poly(trimethylene terephthalate) (PTT), and poly(1,4-butylene terephthalate) (PBT). Examples of commercially available polyester resins for use in the invention include Crastin® PBT polyester resins, Rynite® poly(ethylene terephthalate) polyester resins, and Sorona® polyester resins, all available from E.I. du Pont de Nemours and Co., Wilmington, DE Polyolefin Compositions Polyolefin compositions disclosed herein comprise at least one polyolefin resin and at least one poly alpha-1,3-glucan compound. The concentration of poly alpha-1,3-glucan compound in the polyolefin compositions described herein may range from 0.1 to 60, preferably from 1 to 50 percent, more preferably from 5 to 40, and most preferably from 5 to 35 weight percent, based on the total weight of the polyolefin resin and poly alpha-1,3-glucan compound in the polyolefin composition.

Polyolefin compositions disclosed herein comprise at least one polyolefin and at least one poly alpha-1,3-glucan compound. Nonlimiting examples of polyolefins include polyethylene (PE), polypropylene (PP), and ethylene/α-olefin copolymers such as ethylene/1-octene copolymers, ethylene/propylene copolymers, ethylene/butene copolymers, such as ENGAGE® polyolefin elastomers from Dow Chemical, Midland Michigan Other polyolefins include acrylonitrile-styrene copolymers, acrylonitrile-butadiene-styrene copolymers, styrene-isoprene-styrene copolymers, styrene-hydrogenated isoprene-styrene copolymers, styrene-butadiene-styrene copolymers, and styrene-hydrogenated butadiene-styrene copolymers.

Preparing Poly alpha-1,3-glucan Compounds

The poly alpha-1,3-glucan compounds described herein may be prepared by reaction of poly alpha-1,3-glucan with a functionalized polyolefin in the appropriate solvent(s) or by reactive extrusion. It is preferred that reactive extrusion techniques be used to prepare the poly alpha-1,3-glucan compounds as such processes do not require the use of solvents.

When reactive extrusion is used, all ingredients may be fed into a single screw extruder or twin-screw extruder. Depending on the functionalized polyolefin used, extruder temperatures may range from about 100° C. to about 250° C. All the ingredients may be added at once or gradual addition in batches. When the ingredients are gradually added in batches, a part of the ingredients is first added, and then melt-mixed with the remaining ingredients that are subsequently added, until an adequately mixed composition is obtained. Additives may be added at any point in the extruder. Depending on the additive(s) used, it may not be necessary for the additive to be in the melt state during melt-mixing of other ingredients. The additive may remain a solid so long as the additive is adequately or homogeneously mixed within the poly alpha-1,3-glucan compound.

EXAMPLES

The disclosure is further defined in the following Examples. It should be understood that these Examples, while indicating certain preferred aspects of the disclosure, are given by way of illustration only. From the above discussion and these Examples, one skilled in the art can ascertain the essential characteristics of this disclosure, and without departing from the spirit and scope thereof, can make various changes and modifications to adapt it to various uses and conditions.

The exemplary articles are identified by "E" in the tables below are intended only to further illuminate and not to limit the scope of compounds, processes, and articles described and recited herein. Comparative examples are identified in the tables below by "C".

Materials

In the compounds, processes, and articles exemplified in the tables below, the following materials were used. All percent values are by weight unless indicated otherwise.

Poly alpha-1,3-glucan was enzymatically produced from sucrose using one or more glucosyltransferase (gtf) enzymes following the procedure of example 6 of U.S. Pat. No. 9,080,195 using a gtfJ enzyme.

Functionalized Polyolefin: An ethylene α-olefin copolymer grafted with 1.8 wt % maleic anhydride available from E.I. DuPont de Nemours and Company, Wilmington, DE, USA as TRX301E.

Polyamide: polyamide 612 available as Zytel® 151 from E.I. DuPont de Nemours and Company, Wilmington, DE, USA.

Process for Making Poly Alpha-1,3-Glucan Compounds

The poly alpha-1,3-glucan compounds used in the examples below were prepared by reactive extrusion using a twin-screw extruder. The extruder temperature was set at 190° C. for each heating zone and the poly alpha-1,3-glucan and functionalized polyolefin were fed into the extruder in the desired weight ratios with a residence time in the extruder of about 1 to 2 minutes with any gases generated vented through the vacuum port. The resulting poly alpha-1,3-glucan compound was extruded through an exit die, cooled in a water bath, and pelletized to provide the desired poly alpha-1,3-glucan compound.

Process for Making Polyamide Compositions

For the examples, the polyamide resin and poly alpha-1,3-glucan compound, are compounded together using a twin-screw extruder. The mixture is then injection molded into ASTM D638 Type I tensile bars. The molded tensile bars were tested for mechanical properties and the results shown in Tables 1 and 2.

For the comparative examples, polyamide resin, and when present, poly alpha-1,3-glucan and functionalized polyolefin, were compounded together using a twin-screw extruder. The mixture is then injection molded into ASTM D638 Type I tensile bars. The molded tensile bars were tested for mechanical properties and the results shown in Tables 1 to 3.

Test Methods

Tensile properties, including tensile strength (TS), elongation at break (EB) and tensile modulus (TM) of thermoplastic polymer compositions were measured according to ASTM methods. C1 and E1 to E4 in table 1 were tested according to ASTM D1708 (Micro Tensile) and tested at 23° C. using an Instron Universal tester model 4202 at a crosshead speed of 50.8 mm/min (2 inches/min).

The examples and comparative examples in tables 2-4 were measured per ASTM D638 at 23° C. with Type I bars using an Instron Universal tester model 4202 at a crosshead speed of 50.8 mm/min (2 inches/min). The numerical values listed in the tables are averages of five test samples.

Table 1 shows various physical properties of poly alpha-1,3-glucan compounds disclosed herein in which the amount of poly alpha-1,3-glucan which is reacted with the functionalized polyolefin ranges from 20 to 65 weight percent based on the sum of the total amounts of poly alpha-1,3-glucan and functionalized polyolefin in the poly alpha-1,3-glucan compounds.

TABLE 1

| Ingredient | C1 | E1 | E2 | E3 | E4 |
|---|---|---|---|---|---|
| Functionalized Polyolefin | 100 | 80 | 60 | 50 | 35 |
| Glucan | 0 | 20 | 40 | 50 | 65 |
| Physical Properties | | | | | |
| Elongation at break (%) | 890 | 855 | 587 | 300 | 120 |
| Stress at 100% strain (MPa) | 2.2 | 3.1 | 4.9 | 6.7 | 8.4 |
| Stress at 200% strain (MPa) | 2.9 | 4.6 | 7.4 | 9.8 | — |
| Stress at 300% strain (MPa) | 3.6 | 6.3 | 10 | 12.1 | — |
| Tensile Modulus (MPa) | 4.7 | 7.7 | 14.7 | 21 | 46 |
| Storage Modulus at −50° C. (MPa) | 12536 | 16508 | 31545 | 31846 | 23964 |
| Storage Modulus at 0° C. (MPa) | 333 | 390 | 1062 | 1217 | 1989 |
| Storage Modulus at 23° C. (MPa) | 201 | 177 | 636 | 592 | 975 |
| Storage Modulus at 50° C. (MPa) | 52 | 108 | 312 | 404 | 309 |
| Storage Modulus at 100° C. (MPa) | 32 | 70 | 165 | 259 | 173 |
| Shore A Hardness (MPa) | 72 | 77 | 83 | 88 | 94 |

Table 1 shows that by covalently grafting a functionalized polyolefin onto poly alpha-1,3-glucan, the stress at a given strain, storage modulus, and tensile modulus all increase relative to the functionalized polyolefin which has not been grafted onto poly alpha-1,3-glucan.

Table 2 shows the effect of using poly alpha-1,3-glucan as an individual component in a polyamide resin. Table 3 shows the effect of using poly alpha-1,3-glucan and a functionalized polyolefin as individual components in a polyamide resin.

For table 4, poly alpha-1,3-glucan compound E4 was blended with a polyamide resin for all the examples in the table.

TABLE 2

| Ingredient | C2 | C3 | C4 | C5 | C6 |
|---|---|---|---|---|---|
| Polyamide | 100 | 95 | 90 | 80 | 70 |
| Glucan | 0 | 5 | 10 | 20 | 30 |
| Physical Properties | | | | | |
| Strain at break (%) | 17 | 2.2 | 2 | 2 | 1.8 |
| Izod Impact Strength (KJ/m²) | 3.7 | 2.6 | 2 | 1.6 | 1 |

The results in table 2 show the strain at break and Izod impact strength of a polyamide comprising poly alpha-1,3-glucan. Table 2 clearly shows that the presence of poly alpha-1,3-glucan in the polyamide (C3 to C6) decreases both strain at break and Izod impact strength values compared to the polyamide resin alone (C2).

TABLE 3

| Ingredient | C2 | C7 | C8 | C9 | C10 |
|---|---|---|---|---|---|
| Polyamide | 100 | 92.5 | 85 | 70 | 55 |
| Functionalized Polyolefin | 0 | 2.5 | 5 | 10 | 15 |
| Glucan | 0 | 5 | 10 | 20 | 30 |
| Physical Properties | | | | | |
| Strain at break (%) | 17 | 2.4 | 11.3 | 5.1 | 8 |
| Izod Impact Strength (KJ/m²) | 3.7 | 1.6 | 3.2 | 3.4 | 5.7 |

The results in table 3 show the strain at break and Izod impact strength of a polyamide comprising both poly alpha-1,3-glucan and a functionalized polyolefin in a 2:1 weight ratio respectively, which have been added as separate and individual components into the compositions of table 3. Table 3 shows that the presence of poly alpha-1,3-glucan and a functionalized polyolefin in the polyamide (C7 to C10) decreases both strain at break and Izod impact strength values compared to the polyamide resin alone (C2) except at very high levels of both poly alpha-1,3-glucan and a functionalized polyolefin (C10).

TABLE 4

| Ingredient | C2 | E5 | E6 | E7 | E8 |
|---|---|---|---|---|---|
| Polyamide | 100 | 92.31 | 84.62 | 69.23 | 53.85 |
| Poly alpha-1,3-glucan compound | 0 | 7.69 | 15.38 | 30.77 | 46.15 |
| Physical Properties | | | | | |
| Strain at break (%) | 17 | 15.2 | 16.1 | 15.6 | 15.8 |
| Izod Impact Strength (KJ/m²) | 3.7 | 3.8 | 4.3 | 6.4 | 8.3 |

Table 4 shows the strain at break and Izod impact strength of a polyamide composition comprising a poly alpha-1,3-glucan compound disclosed herein. Table 4 shows the presence of a poly alpha-1,3-glucan compound in a polyamide composition (E5 to E8) improves Izod impact strength compared to a polyamide composition which only comprises a polyamide resin (C2) without a significant decrease in strain at break.

The invention claimed is:

1. A poly alpha-1,3-glucan compound comprising:
   (a) poly alpha-1,3-glucan, and
   (b) an anhydride-grafted ethylene/α-olefin copolymer;
   wherein said poly alpha-1,3-glucan compound comprises 0.5 to 70 weight percent of the poly alpha-1,3-glucan based on the total weight of the poly alpha-1,3-glucan and the anhydride-grafted ethylene/α-olefin copolymer in the poly alpha-1,3-glucan compound,
   and wherein said anhydride-grafted ethylene/α-olefin copolymer is grafted onto the poly alpha-1,3-glucan.

2. The poly alpha-1,3-glucan compound of claim 1, wherein the anhydride-grafted ethylene/α-olefin copolymer is a maleic anhydride-grafted ethylene/α-olefin copolymer.

3. The poly alpha-1,3-glucan compound of claim 1, comprising 5 to 60 weight percent of the poly alpha-1,3-glucan.

4. The poly alpha-1,3-glucan compound of claim 1, in the form of a film, pellet, or strand.

5. A composition comprising 1 to 70 weight percent of the poly alpha-1,3-glucan compound of claim 1.

6. The composition of claim 5, comprising 5 to 60 weight percent of the poly alpha-1,3-glucan compound.

7. The composition of claim 5, wherein the composition further comprises a polyester or polyolefin.

8. The composition of claim 5, wherein the composition further comprises a polyamide.

9. The composition of claim 8, wherein the polyamide is poly(hexamethylene hexanediamide).

10. The composition of claim 8, wherein the polyamide is poly(hexamethylene dodecanediamide).

11. The composition of claim 8, wherein the polyamide is poly(hexamethylene decanediamide).

12. The poly alpha-1,3-glucan compound of claim 1, wherein at least 50% of the glycosidic linkages of the poly alpha-1,3-glucan are alpha-1,3-glycosidic linkages.

13. The poly alpha-1,3-glucan compound of claim 1, wherein at least 90% of the glycosidic linkages of the poly alpha-1,3-glucan are alpha-1,3-glycosidic linkages.

* * * * *